US012679390B2

(12) United States Patent
Groezinger et al.

(10) Patent No.: US 12,679,390 B2
(45) Date of Patent: Jul. 14, 2026

(54) UNKNOWN

(71) Applicant: Robert Bosch GmbH, Stuttgart (DE)

(72) Inventors: Daniel Groezinger, Stuttgart (DE);
Joerg Gebers, Hemmingen (DE);
Norbert Mueller, Tel Aviv (IL); Peter Feuerstack, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 18/896,189

(22) Filed: Sep. 25, 2024

(65) Prior Publication Data

US 2025/0100560 A1 Mar. 27, 2025

(30) Foreign Application Priority Data

Sep. 27, 2023 (DE) ..................... 10 2023 209 461.4

(51) Int. Cl.
*B60W 50/00* (2006.01)
(52) U.S. Cl.
CPC ..... *B60W 50/0098* (2013.01); *B60W 2556/50* (2020.02)
(58) Field of Classification Search
CPC ...................... B60W 50/0098; B60W 2556/50
See application file for complete search history.

(56) References Cited

U.S. PATENT DOCUMENTS 11,945,445 B1 * 4/2024 Maleitzke ........... B60W 10/182
2022/0398874 A1 * 12/2022 Hizaki ................. G07C 5/0841
2024/0203177 A1 * 6/2024 Jeong ....................... G07C 5/02

FOREIGN PATENT DOCUMENTS

| DE | 10250616 C1 | 11/2003 |
|----|-------------|---------|
| DE | 102009027593 A1 | 1/2011 |
| DE | 102014217137 A1 | 3/2016 |
| DE | 102014224485 A1 | 6/2016 |
| DE | 102015205075 A1 | 9/2016 |
| DE | 102016215388 A1 | 2/2018 |

* cited by examiner

*Primary Examiner* — Dylan M Katz
(74) *Attorney, Agent, or Firm* — Michael Best & Friedrich LLP

(57) ABSTRACT

The present invention creates a method for controlling a control unit network of a plurality of electronic control units of an electric vehicle and a corresponding control unit network. The method comprises the steps of identifying (S1; S1') a current parking condition of a motor vehicle, in which an active motor vehicle operating function is in place comprising at least one control unit that can be deactivated, identifying (S1; S1') one or more operating parameters of the parking condition, identifying (S1; S1') a geographic location of the parking condition, evaluating (S3; S3') the identified geographic location of the parking condition and the identified operating parameters of the parking condition, creating (S4; S4') an operating plan of the unit network with respect to deactivation of one or more deactivatable control units of the unit network, based on the identified geographic location of the parking condition and the identified operating parameters of the parking condition and corresponding saved criteria for the geographic location and the operating parameters of the parking condition, and executing (S5; S5') the created operating plan by automatically deactivating the deactivatable control units of the unit network, based on the created operating plan.

8 Claims, 3 Drawing Sheets

UNKNOWN

BACKGROUND

The present invention relates to a method for controlling a control unit network of a plurality of electronic control units of an electric vehicle and a corresponding control unit network.

The interior of modern motor vehicles is largely comprised of computer-aided electronics. With programmable controllers, a variety of functions are realized today. They control, for example, ignition and fuel injection, but also comfort functions such as climate control as well as safety systems and driver assistance systems such as the anti-lock braking system (ABS) or the electronic stability program (ESP). So-called control units are responsible for the electronic control of these systems.

Control units operate according to the so-called "EVA" principle: They receive signals from sensors and operating elements, evaluate them and control so-called actuators, which are responsible for translating the signals from the control unit into a specific action. Control units are networked via a data bus and can thus communicate with one another.

Many electronic control units (typically 50-100) are typically installed in modern motor vehicles, which have different control tasks before, during and after the driving operation. Each of these control units, when activated, consumes a minimum amount of electrical power while in the idle state.

Situations in which a vehicle is parked place particular requirements on the operating state of an on-board vehicle network. In such conditions, in modern vehicles, at least some parts or functions of the on-board power system continue to be maintained in operation, for example, units belonging to the radio interface of the locking system via which a radio connection belongs to a remote control key for the vehicle, or for example units permitting remote access to the vehicle.

In an electric vehicle, there is an additional mode of operation, namely the charging mode, compared to a classical combustion vehicle. Depending on the charging power, the charging operation takes a few to several hours. During charging, the subsystems not needed for the charging operation are placed in standby.

Today's electric vehicles often leave numerous safety units for monitoring the vehicle and battery on when parking in order to be able to react quickly. Examples include vehicle unlocking, app monitoring, guard mode, pre-cooling, touchless boarding. An energy saving mode must be manually selected and set (if present).

DE 102 50 616 C1 and DE 10 2009 027 593 A1 disclose, for example, corresponding on-board vehicle networks. A superordinate, so-called master control unit of the on-board power system can selectively switch so-called slave control units that are subordinate to it between a standby mode (also called sleep operation mode or sleep mode) and the normal operation state (also called normal operation mode) via corresponding control signals. During its standby operating mode, a control unit is in particular at least capable of receiving wake-up signals and then switching to the normal operating state.

DE 10 2014 224 485 A1 discloses an on-board power system for a vehicle comprising a power source and at least one sensing control unit, which is configured to scan status signals from at least one further control unit and/or at least one switching unit with a predetermined cycle time. The on-board power system is configured to switch from a first operating state, the so-called normal operating state, to a second operating state, the so-called standby operating state, in which it consumes less power than in the normal operating state. It is further configured to sense status signals with a shorter cycle time in the normal operating state than in the standby operating state. The sensing control unit is configured such that in the standby operating state, the cycle time is automatically changed from a first standby cycle time to a second standby cycle time by means of a predetermined change parameter.

DE 10 2016 215 388 A1 discloses a method for planning and controlling an idle operation of a motor vehicle, and in particular for preparatory planning and subsequently controlling functions of the vehicle during idle operation, in particular a method for planning and controlling at least one function of the vehicle in idle operation, based on a prediction of the length of an expected service life of the vehicle.

For all known systems, an energy saving mode (if any) must be manually selected and set or only activates with long service lives and low battery levels. Without power saving mode, the vehicle's own consumption may be up to 1 kWh per day. Particularly when using the vehicle as a stationary battery, a high power consumption is not desired.

SUMMARY

According to the invention, a method for controlling a control unit network of a plurality of electronic control units of an electric vehicle as well as a control unit network is provided.

The underlying idea of the present invention is to minimize the required power of the control unit network of the electric vehicle as a function of a predetermined parking situation.

A core of the invention is the creation of an operating plan of the unit network with respect to deactivation of one or more deactivatable control units of the unit network based on the identified geographic location of the parking condition and the identified operating parameters of the parking condition and corresponding saved criteria for the geographic location and the operating parameters of the parking condition.

The invention thus allows a minimization of the power consumption of the control unit network.

Advantageous embodiments and developments emerge from the further dependent claims and from the description with reference to the figures.

According to a preferred further development, at least one predetermined address, in particular a home address, is stored as a criterion for the geographic location.

According to a further preferred further development, the operating plan provides for a deactivation of all deactivatable control units of the unit network when the identified geographic location coincides with the predetermined address.

According to another preferred further development, the operating parameters of the parking condition provide an occupancy status of the electric vehicle with occupants, wherein the operating plan provides no deactivation, or a deactivation delayed by a predetermined period of time, of all deactivatable control units of the unit network, when the identified geographic location coincides with the predetermined address and when the identified operating parameter of the parking condition provides an occupancy status of the electric vehicle with occupants.

According to another preferred further development, the predetermined time period is input by an occupant.

According to another preferred further development, the operating parameters of the parking condition provide a use state of the electric vehicle as a stationary energy storage system in a local power grid, wherein the operating plan provides for deactivating all control units of the unit network when the status of the electric vehicle is identified as a stationary energy storage system in a local power grid as an operating parameter of the parking condition.

According to another preferred further development, evaluating the identified geographic location of the parking condition and the identified operating parameters of the parking condition includes predicting future progression of the parking condition over time and the operating parameters of the parking condition, wherein the operating plan is created based on the predicted progression of the parking condition over time and the operating parameters of the parking condition.

According to a further preferred further development, during the parking condition, the operating parameters of the parking conditions are acted upon based upon a cyclic re-identification of one or more operating parameters of the parking condition, reevaluation of the identified operating parameters of the parking condition, and recreation of an operating plan of the unit network with respect to deactivating one or more deactivatable control units of the unit network based on the identified operating parameters of the parking condition and corresponding saved criteria.

BRIEF DESCRIPTION OF THE DRAWINGS

The present invention is explained in greater detail below with reference to the exemplary embodiments indicated in the figures. The figures show.

DETAILED DESCRIPTION

Figure 1:
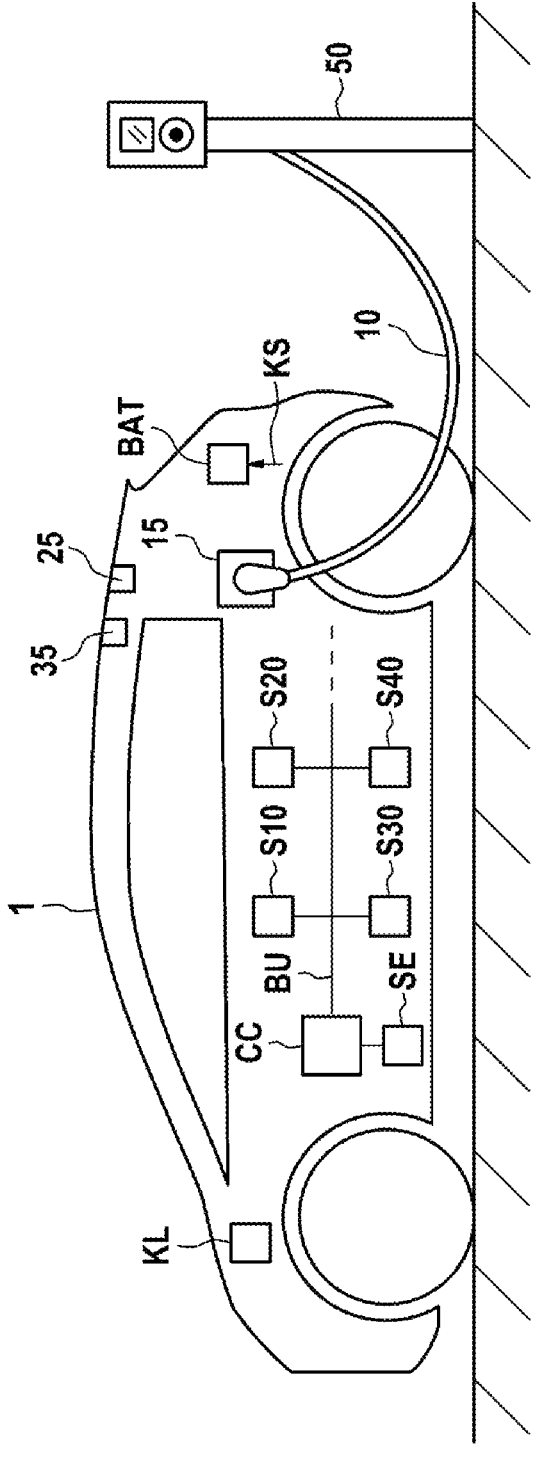
FIG. 1 a schematic block diagram explaining a control unit network of a plurality of electronic control units of an electric vehicle according to a first embodiment of the present invention.

The figures are intended to provide a better understanding of the embodiments of the invention. They illustrate embodiments and, in connection with the description, serve to explain principles and concepts of the invention. Other embodiments and many of the mentioned advantages become apparent from the drawings. The elements of the drawings are not necessarily shown to scale with respect to one another.

In the figures of the drawing, identical, functionally identical, and identically acting elements, features and components, are each shown with the same reference numbers, unless otherwise stated.

FIG. 1 is a schematic block diagram explaining a control unit network of a plurality of electronic control units of an electric vehicle according to a first embodiment of the present invention.

In FIG. 1, reference number 1 refers to an electric vehicle comprising a rechargeable drive battery BAT. The electric vehicle 1 is parked in a garage at the home address. The drive battery BAT is connected to a wall outlet 50 via a charging cable 10, which is inserted into a corresponding socket 15 of the electric vehicle 1. The electric vehicle 1 is in a use state the electric vehicle as a stationary energy storage system in a local power grid, which is controlled by a charging controller (not shown). In other words, the electric vehicle 1 supplies electrical energy from the drive battery BAT to the local network.

A control unit network with a plurality of electronic control units S10-S40, which are networked via a CAN bus BU, is provided in the electric vehicle 1. Furthermore, connected to the CAN bus is a central control unit CC, which can execute operating programs stored therein during operation of the electric vehicle 1.

Only by way of example, and not a conclusive list, are an engine control unit S10 for engine control, a brake control unit S20 for brake control, a climate control unit S30 for control of a climate system KL, and a cooling control unit S40 for control of a cooling system KS for cooling the drive battery BAT while driving and charging.

Reference number 25 refers to a GPS antenna and reference number 35 refers to a network antenna, e.g., for Wi-Fi and/or LTE and/or beacon.

Furthermore, reference number SE designates a sensing unit a plurality of sensors for identifying various operating conditions as well as associated operating parameters.

Particularly detectable by the sensor unit SE is a parking state of the electric vehicle 1, a geographic location of the electric vehicle 1 in connection with the GPS antenna 25 and the network antenna 35, respectively.

The functions of the components shown in FIG. 1 are discussed below with reference to FIGS. 2 and 3.

Figure 2:
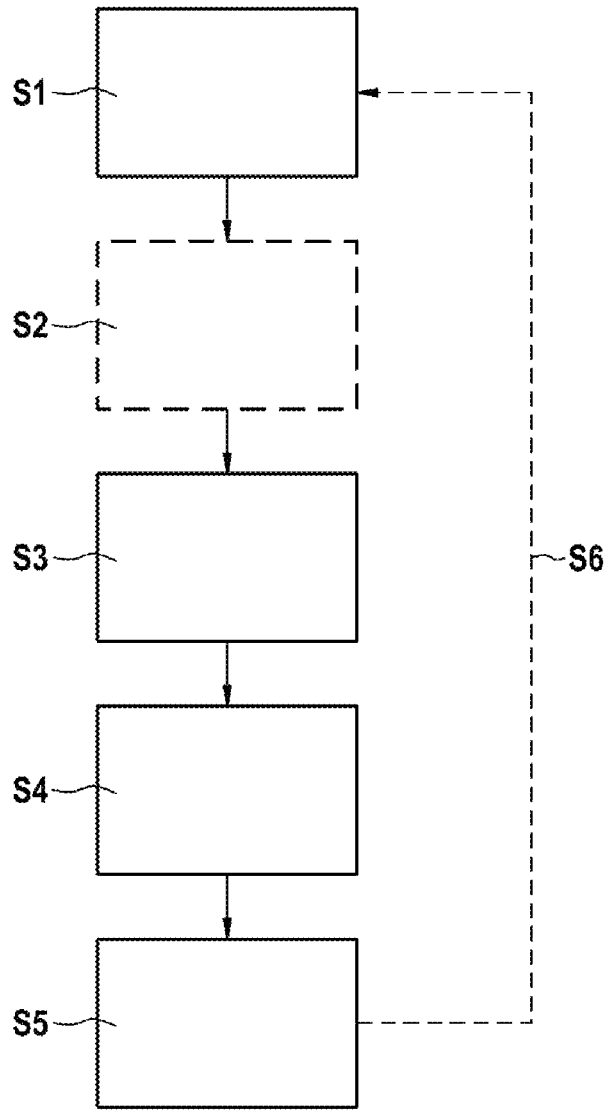
FIG. 2 a flowchart explaining a method of controlling a control unit network of a plurality of electronic control units of an electric vehicle according to the first embodiment of the present invention.

FIG. 2 is a flowchart explaining a method of controlling a control unit network of a plurality of electronic control units of an electric vehicle according to the first embodiment of the present invention.

In step S1, identification of a current parking condition of the motor vehicle, in which an active operating function of the motor vehicle in which the at least one control unit is deactivatable, is performed by the sensor unit SE.

It is possible to determine that certain control units cannot be deactivated, e.g., a monitoring unit (not shown) for the drive battery BAT.

In addition, in step S1, one or more operating parameters of the parking condition and a geographic location of the parking condition are identified by the sensor unit SE.

Optionally, in step S2, a prediction of a future progression of the parking condition and the operating parameters of the parking condition over time is made by the central control unit CC.

By means of the central control unit CC, the identified geographic location of the parking condition and the identified operating parameters of the parking condition are further evaluated in step S3.

In step S4, an operating plan of the unit network is created with respect to deactivation of one or more deactivatable control units of the unit network based on the identified geographic location of the parking condition and the identified operating parameters of the parking condition and corresponding saved criteria for the geographic location and the operating parameters of the parking condition by the central control unit CC and finally, in step S5, the created operating plan is executed by automatically deactivating the deactivatable control units of the unit network based on the operating plan created by means of the central CC.

Optionally, the operating parameters of the parking condition are determined by means of a re-identification S1 of one or more operating parameters of the parking condition takes place cyclically by returning to step S6 during the parking condition, once again optionally predicting a future progression of the parking condition and the operating parameters of the parking condition over time, once again evaluating S3 the identified operating parameters of the parking condition, and re-creating S4 an operating plan of the unit network with respect to deactivation of one or more deactivatable control units of the unit network based on the identified operating parameters of the parking condition and corresponding saved criteria.

The creation of the operating plan of the unit network with respect to deactivation of one or more deactivatable control units of the unit network based on the identified geographic location of the parking condition and the identified operating parameters of the parking condition and corresponding saved criteria for the geographic location and the operating parameters of the parking condition by the central control unit CC is explained in more detail below.

In the first embodiment, at least one predetermined address, in particular a home address, is saved as the geographic location criterion, wherein the operating plan provides a deactivation of all control units S10-S40 of the unit network when the identified geographic location coincides with the predetermined address.

Alternatively, the operating parameters of the parking condition may provide an occupancy status of the electric vehicle with occupants, detectable by the sensor unit SE, wherein the operating plan provides no or a delayed deactivation of all control units S10-S40 of the unit network for a predetermined period of time, when the identified geographic location coincides with the predetermined address and when the identified operating parameter of the parking condition provides an occupancy status of the electric vehicle with occupants. This predetermined period of time can be input by an occupant via an input unit (not shown).

Figure 3:
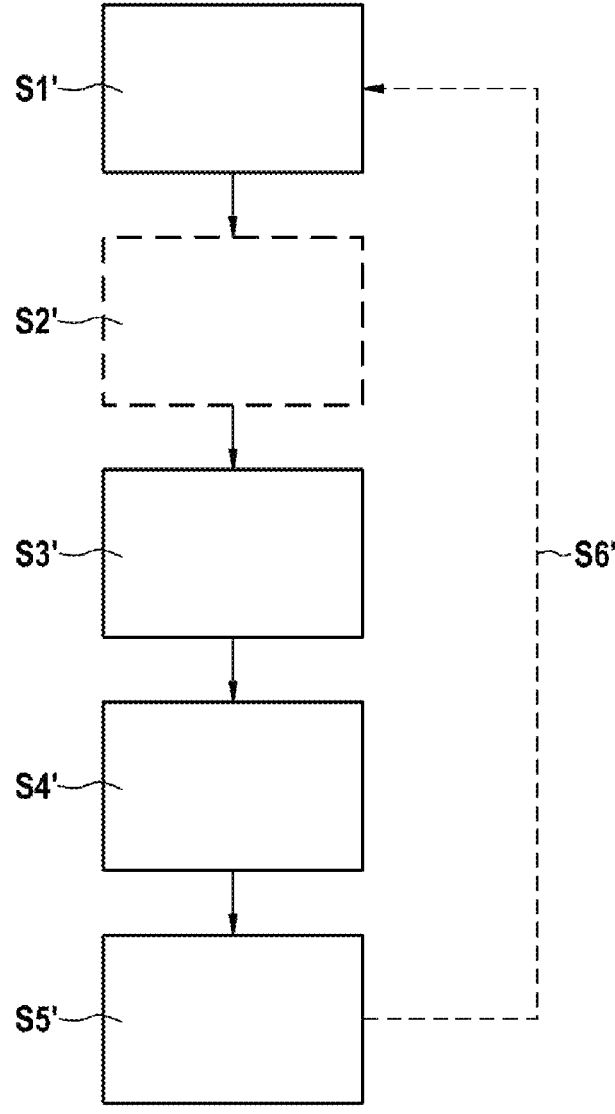
FIG. 3 a flowchart explaining a method for controlling a control unit network of a plurality of electronic control units of an electric vehicle according to a second embodiment of the present invention.

FIG. 3 is a flowchart explaining a method for controlling a control unit network of a plurality of electronic control units of an electric vehicle according to a second embodiment of the present invention. Steps S1' to S6' correspond to steps S1 to S6 of the first embodiment.

In contrast to the first embodiment, in the second embodiment, the creation of the operating plan occurs differently. Here, the operating parameters of the parking condition provide a use state of the electric vehicle as a stationary energy storage system in a local power grid, whereby the operating plan provides a deactivation of all control units S10-S40 of the unit network when the use state of the electric vehicle is identified as a stationary energy storage system in a local power grid as an operating parameter of the parking condition.

In other words, deactivation of all control units S10-S40 of the unit network occurs only based on the parking status and the operating parameter of the parking condition as the use state of the electric vehicle as a stationary energy storage system in a local power grid, regardless of the identified geographic location.

Otherwise, the second embodiment is identical to the first embodiment.

Although the present invention has been described with reference to preferable embodiments, it is not limited thereto and can be modified in many ways.

In particular, the present invention is applicable to any control units.

The invention claimed is:

1. A method for controlling a control unit network of a plurality of electronic control units (S10-S40) of an motor vehicle (1), the method comprising the steps of:

identifying (S1; S1'), via a computer, a current parking condition of the motor vehicle in which an active motor vehicle operating function is in place, wherein the motor vehicle comprises at least one control unit that is deactivatable;

identifying (S1; S1'), via the computer, one or more operating parameters of the parking condition including an occupancy status of the motor vehicle with occupants;

identifying (S1; S1'), via the computer, a geographic location of the parking condition, wherein at least one predetermined address is saved as a criterion for the geographic location;

evaluating (S3; S3'), via the computer, the identified geographic location of the parking condition and the identified operating parameters of the parking condition;

creating (S4; S4'), via the computer, an operating plan of the unit network with respect to deactivating one or more deactivatable control units of the unit network based on the identified geographic location of the parking condition and the identified operating parameters of the parking condition and corresponding saved criteria for the geographic location and the operating parameters of the parking condition; and executing (S5; S5') the created operating plan by automatically deactivating the deactivatable control units of the unit network based on the created operating plan, wherein the operating parameters of the parking condition provide an occupancy status of the motor vehicle with occupants, wherein the operating plan provides a no or a delayed deactivation of all deactivatable control units (S10-S40) of the unit network for a predetermined period of time, when the identified geographic location coincides with the predetermined address and when the identified operating parameter of the parking condition provides an occupancy status of the motor vehicle with occupants, wherein the predetermined period of time is input by an occupant.

2. The method according to claim 1, wherein the operating plan provides for deactivation of all deactivatable control units (S10-S40) of the unit network when the identified geographic location coincides with the predetermined address.

3. The method according to claim 1, wherein the operating parameters of the parking condition provide a use state of the motor vehicle as a stationary energy storage system in a local power grid, and wherein the operating plan provides for deactivation of all control units (S10-S40) of the unit network when the use state of the motor vehicle is identified as a stationary energy storage system in a local power grid as an operating parameter of the parking condition.

4. The method according to claim 1, wherein evaluating (S3; S3') the identified geographic location of the parking condition and the identified operating parameters of the parking condition comprises predicting future progression of the parking condition and the operating parameters of the parking condition over time, and wherein the operating plan is created based on the predicted progression of the parking condition and the operating parameters of the parking condition over time.

5. The method according to claim 1, wherein, during the parking condition the operating parameters of the parking condition are determined by means of a cyclic re-identification (S1; S1') of one or more operating parameters of the parking condition, a re-evaluation (S3; S3') of the identified operating parameters of the parking condition, and recreation (S4; S4') of an operating plan of the unit network with respect to the deactivation of one or more deactivatable control units of the unit network based on the identified operating parameters of the parking condition and corresponding saved criteria.

6. A control unit network with:

a plurality of electronic control units (S10-S40) of an motor vehicle (1);

a sensing unit (SE) for identifying (S1; S1') a current parking condition of the motor vehicle, in which there is an active motor vehicle operating function with at least one deactivatable control unit, for identifying (S1; S1') one or more operating parameters of the parking condition, and for identifying (S1; S1') a geographic location of the parking condition;

an evaluation unit (CC) for evaluating (S3; S3') the identified geographic location of the parking condition and the identified operating parameters of the parking condition, creating (S4; S4') an operating plan of the unit network with respect to deactivation of one or more deactivatable control units of the unit network based on the identified geographic location of the parking condition and the identified operating parameters of the parking condition and corresponding saved criteria for the geographic location and the operating parameters of the parking condition, and execution of (S5; S5') the created operating plan by automatically deactivating the deactivatable control units of the unit network based on the created operating plan, wherein the operating parameters of the parking condition provide an occupancy status of the motor vehicle with occupants, wherein the operating plan provides a no or a delayed deactivation of all deactivatable control units (S10-S40) of the unit network for a predetermined period of time, when the identified geographic location coincides with the predetermined address and when the identified operating parameter of the parking condition provides an occupancy status of the motor vehicle with occupants, wherein the predetermined period of time is input by an occupant.

7. The control unit network according to claim 6, wherein the operating plan provides for deactivation of all deactivatable control units (S10-S40) of the unit network when the identified geographic location coincides with the predetermined address.

8. The control unit network according to claim 6, wherein the operating parameters of the parking condition provide a use state of the motor vehicle as a stationary energy storage system in a local power grid, and wherein the operating plan provides for deactivation of all control units (S10-S40) of the motor vehicle network when the identified operating parameter of the parking condition is the use state of the motor vehicle as a stationary energy storage system in a local power grid.

* * * * *